US008712786B2

(12) United States Patent
Sharp

(10) Patent No.: US 8,712,786 B2
(45) Date of Patent: Apr. 29, 2014

(54) METHOD AND APPARATUS FOR CONTROLLING A MULTI-NODE PROCESS

(75) Inventor: Christopher Edward Sharp, Winchester (GB)

(73) Assignee: International Business Machines Corporation, Armonk, NY (US)

(*) Notice: Subject to any disclaimer, the term of this patent is extended or adjusted under 35 U.S.C. 154(b) by 4098 days.

(21) Appl. No.: 10/292,686

(22) Filed: Nov. 12, 2002

(65) Prior Publication Data
US 2003/0120596 A1 Jun. 26, 2003

(30) Foreign Application Priority Data
Dec. 22, 2001 (GB) .................................. 0130864.2

(51) Int. Cl.
G06Q 10/00 (2012.01)
(52) U.S. Cl.
USPC ........................................................ 705/1.1
(58) Field of Classification Search
USPC ........................................................... 705/26
See application file for complete search history.

(56) References Cited

U.S. PATENT DOCUMENTS

| 5,604,896 | A | 2/1997 | Duxbury et al. | |
| 7,035,828 | B2* | 4/2006 | Ketonen et al. | 705/51 |
| 2001/0051902 | A1* | 12/2001 | Messner | 705/26 |
| 2002/0138358 | A1* | 9/2002 | Scheer | 705/26 |
| 2003/0115111 | A1* | 6/2003 | Fisher | 705/26 |

FOREIGN PATENT DOCUMENTS

| EP | 0634718 | 1/1995 | ............. G06F 9/445 |
| EP | 0634718 A2 | 1/1995 | |
| EP | 9957657 | 11/1999 | |

OTHER PUBLICATIONS

Schulz K, et al: 'Architecting Cross-Organisational B2B Interactions', Enterprise Distributed Object Computing Conference 2000, pp. 92-101, XP010521580 ISBN: 0-7695-0865-0.
"Two Approaches to Bringing Internet Services to WAP Devices", by Eija Kaasinen, et al. Proceedings of the 9th International World Wide Web Conference. vol. 33, Amsterdam.
Todino, et al., "Learning the UNIX Operating System, Fourth Edition," Dec. 1, 1997, p. 4.

* cited by examiner

Primary Examiner — Shannon Campbell
(74) Attorney, Agent, or Firm — Steven M. Greenberg, Esq.; CRGO Law

(57) ABSTRACT

This invention relates to a method and apparatus for controlling multi-node services. There is described a process broker for controlling a process between two or more clients and service registry comprising; a plurality of process templates, each process template representing a process to co-ordinate a service on nodes and comprising one or more steps for coordinating such a service with each node; means for receiving a message from a first node; means for selecting a process template and participating node/s in response to the message; means for envoking the process steps as defined in the selected process template on the selected nodes; and means for responding to the first node with a response of the type defined in the selected process template and based on the response from the participating node/s.

21 Claims, 4 Drawing Sheets

METHOD AND APPARATUS FOR CONTROLLING A MULTI-NODE PROCESS

This invention relates to a method and apparatus for controlling a multi-node process. In particular it relates to a broker system which controls a process between two or more client systems.

BACKGROUND

Web services describe the set of protocols and technologies that enable applications to communicate with each other over the internet. They are part of the e-business framework that relate to bringing commercial services into the internet world with the same quality of service that one would expect from traditional services.

A simple web service involves two parties, a client and a server connected over the internet. The client sends a request over the internet to the server; the server processes the request and sends a response back over the internet to the client; and the client receives the information. Such information could be a weather forecast.

A more complex web service involves multiple nodes such as shown in the prior art of FIG. 1. A client 12 (seller) sends and receives messages from a client 14 (buyer) in order to receive a payment from the client 14. A payment service 18 makes payments on behalf of client 14 and payment service 16 receives payments on behalf of client 12. In this example client 12 requests payment from client 14; client 14 passes the request to payment service 18; payment service 18 prepares a payment order which is forwarded through client 14 and client 12 to payment service 16; payment service 16 sends a message to client 12 if the payment order is excepted.

In the above service a process of fixed steps is defined in each node where each node co-ordinates the next step in the process. Knowledge of the process steps is held in each node. Each node only knows how to perform certain steps in the process on its own or with another node. Each step in the process leads to a further step in the process whereby the process is not defined centrally but across the group of nodes. Once a node has finished its own step in the process it will trigger the next node to start the next step. In this example the node has some control but not individual control of the process.

Such a distributed process is fixed to that process and those nodes. What is required is a solution where a client can choose a process and choose the nodes to be included in that process.

SUMMARY OF INVENTION

According to a first aspect of the present invention there is provided a system for controlling a process between two or more nodes as defined in claim 1.

Such a system is called a process broker in the preferred embodiment. A node (called a client in the preferred embodiment) is preferably configured to exclusively interact with the process broker and not with other nodes so that no node can perform processes on that exclusive node without the interaction of the broker. Preferably, such a broker becomes a trusted party. Most preferably, using such a broker system, multiple sub-processes which form part of an overall process are given a single point of focus.

Preferably, such a system provides a simple command orientated interface for application developers to enable a client to interact with any predefined service without the knowledge of how actually to interact with that service. Such knowledge is stored within the system.

Preferably, the nodes may be one of a number of computer system types. The first node may be a client for envoking a process to buy a product or a service. The second node may be a client with goods or services to dispose of. Another node may be a payment service for the first node and the second node. A further node might be a service registry for locating connection details of the node e.g. the payment service.

DESCRIPTION OF DRAWINGS

A preferred embodiment of the invention will now be described, by means of example only, with reference to the accompanying figures in which.

DESCRIPTION OF THE PREFERRED EMBODIMENTS

Figure 1:
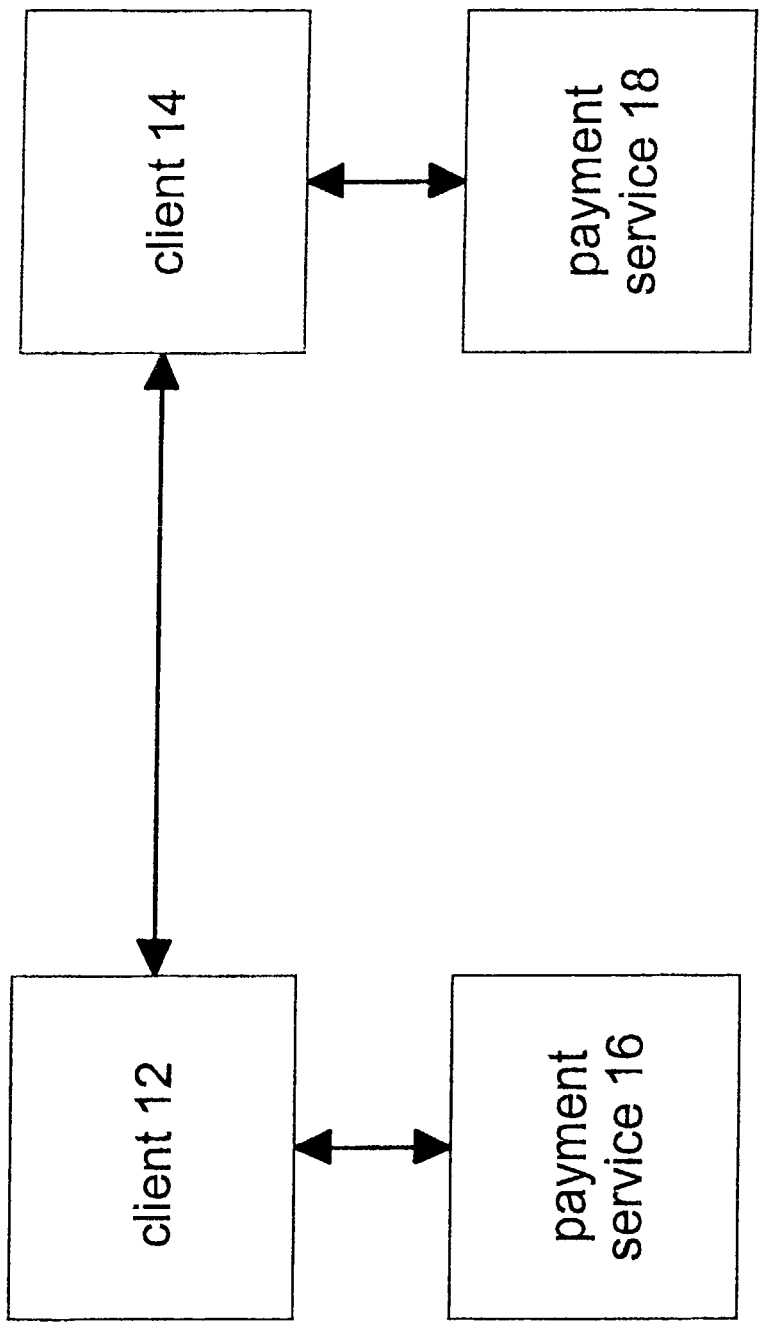
FIG. 1 is a schematic overview of a multi-node prior art payment process.
Figure 2:
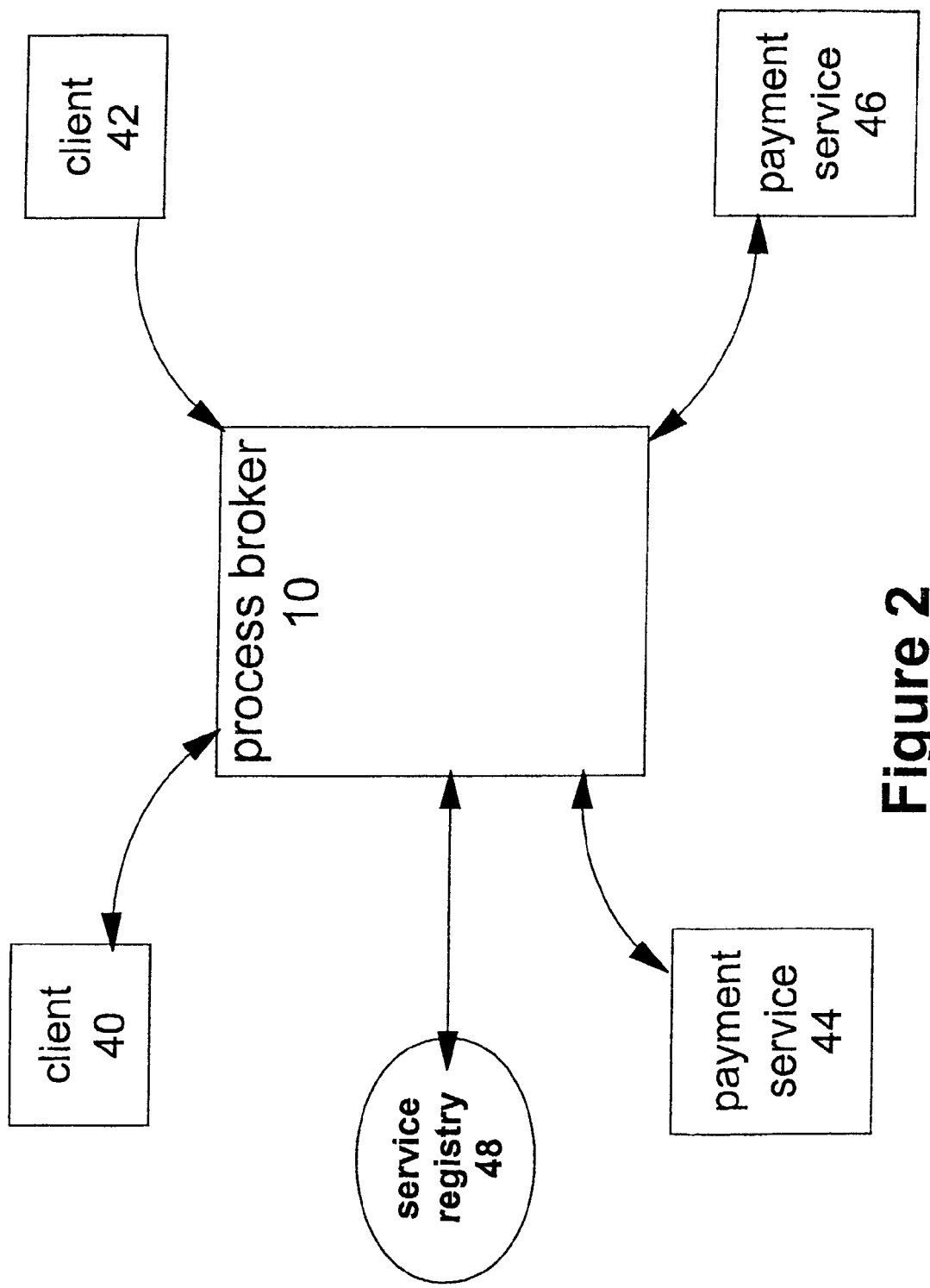
FIG. 2 is a schematic overview of a multi-node payment process of the present embodiment.

The components of the whole system of nodes is described with reference to FIG. 2. There is shown client 40 and client 42 connected via a network or networks to process broker 10. Also connected to process broker 10 are payment service 44; payment service 46; and service registry 48.

Client 40 stores relevant data in secure store, in this case the relevant data is the name of its payment service 44 and account details held by the payment service 44. Client 40 and 42 are capable of sending and receiving data to and from the process broker 10. In this embodiment client 40 is a WAP enabled mobile phone using WAP transport protocol to communicate with the process broker 10. Client 42 communicates with the process broker 10 via the common network protocol which is HTTP.

Service registry 48 contains connection details of the payment service 44 and 46. Such connections details are acquired by the process broker 10 using a node name supplied by the clients.

The network connects all the nodes including the clients, broker and service registry that use the service. The process broker 10 has multiple network transport capability and uses a common HTTP protocol over a network to co-ordinate the web services.

Figure 3:
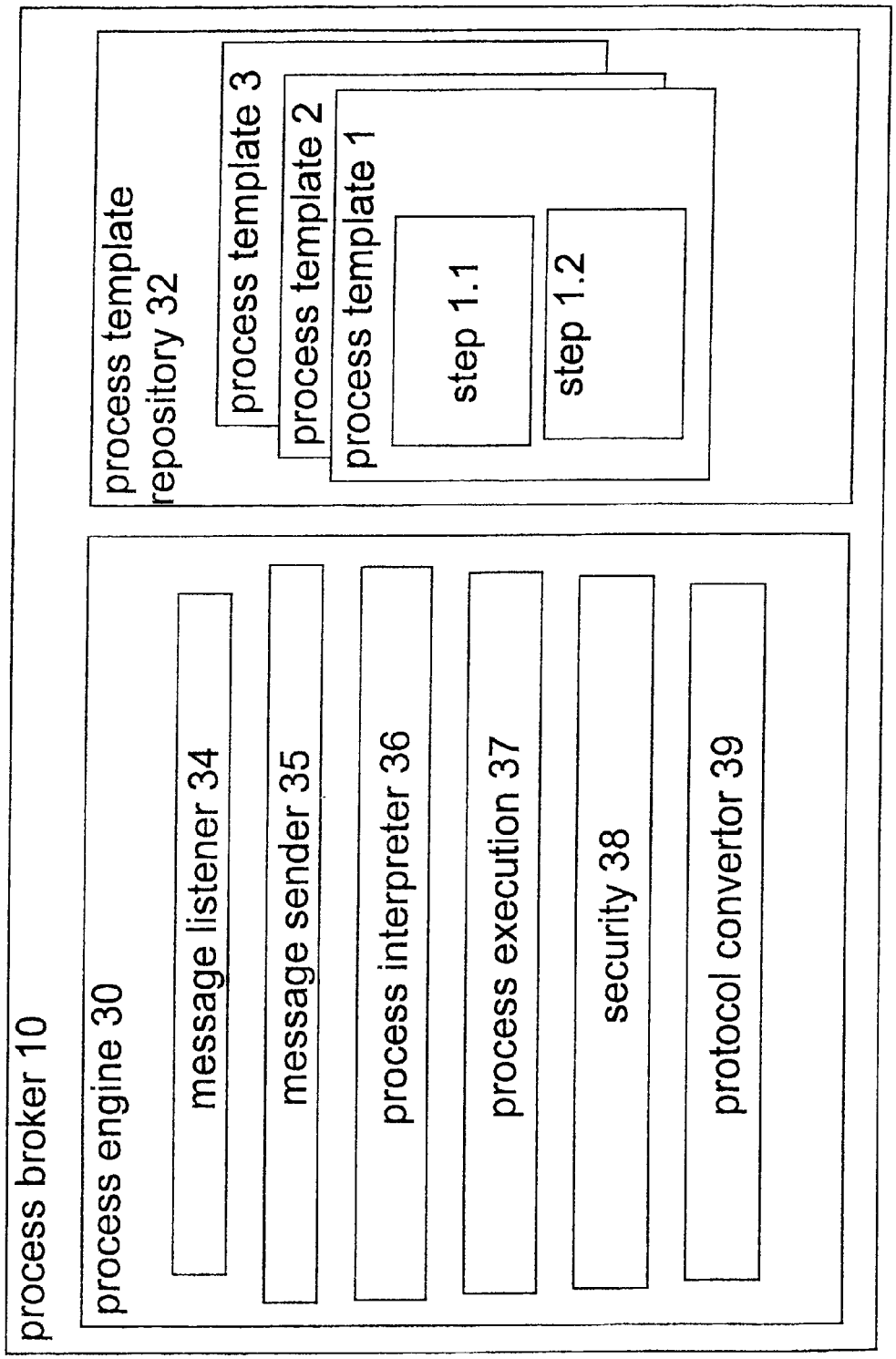
FIG. 3 is a schematic diagram of the main components of the process broker of the present embodiment.

Process broker 10 is capable of executing services and is shown in more detail in FIG. 3. In this embodiment the process broker is built using IBM® WebSphere® Business Process Beans and runs on an IBM Websphere Web Application Server. However any language or platform may be used if it can run, execute, process and invoke services. The function of the process broker 10 is to store process templates; execute those process templates; maintain state of execution; and handle data between execution steps. Examples of process templates are described.

The process broker 10 comprises process engine 30 and process template repository 32. Process engine 30 comprises the body of the components: message listener 34; message sender 35; process interpreter 36; process execution 37; security 38 and protocol converter 39. Process template repository 32 comprises process template 1 (the payment process template); process template 2 (the payment process template with encryption) and payment process template 3 (the exchange of digital goods for payment).

Message listener 34 receives messages from the nodes. This component is capable of receiving messages (whether requests or responses from parties) over whatever transport protocol is used. If the protocol is not the common protocol, but a different protocol, then the protocol convertor 39 is called to convert the different it protocol message. The different protocol is stored so that subsequent messages can be converted different protocol. Message listener 34 distinguishes messages which are part of a current process and those which are requesting execution of a new process by identifying a session id or lack of one in the message. If there is no session id then the message is passed on to the process interpreter 36. If there is a session id then the message is passed on to the process execution 37.

Message sender 35 transmits messages to the nodes. This component is capable of sending messages (whether requests or responses from parties) over the HTTP transport mechanisms. Normally each message will contain a session id which can be included in the response to show that the message is part of an on going process. If it is known that the receiving node supports a different protocol and does not support the common protocol then the protocol convertor 39 is called to convert to that different protocol before the message is sent.

Process interpreter 36 parses a message with no session id to identify if the message is to initiate a session with process execution 37. It then identifies a process template and parameters from the message (including nodes) for subsequent execution by the process execution 37 and assigns a session number for the processing of the process template.

Process execution 37 parses the steps in a selected process template and calls various methods. It also parses responses from nodes if they contain a session id. It counts the steps in the template and executes each one sequentially. Four main methods are described here: internal method; call node method; node address method and role management method. The internal method may be any one of the many internal methods for example mathematical operations, logical operations, string operations, local method calls. The call node method uses message sender 35 to communicate with a node and request a service be performed. This method needs a node address. On returning from a call node method the response is stored and used in the processing of further steps. Node address method acquires a node address by sending a node name to a service directory. This method is invoked when only a node name is given by the initiating or subsequent clients. The role management method to allocate node names to roles and is used when a node name is not directly referenced in a process template. A process template defines a process in terms of roles e.g. source node; target node; payment service of target node. The role management method allocates the roles to specific nodes from the parameters supplied in the first and subsequent messages from the nodes.

Security component 38 identifies requests for a secure process. The process broker 10 itself does not use nor need to use any encrypted data except to pass it on to the relevant node.

The security component comprises methods for: identifying a request for a secure process template and selecting such a secure process template; identifying a secure process in process template.

A process template is the term used here to describe a generic interaction between one of more nodes. Such a description is used by the system to co-ordinate a web process between the nodes. The process template is described in a language suitable for execution by the system, it defines a particular process for achieving a specific goal between multiple nodes, such as a payment process or an exchange of goods process. The process template defines the information that needs to be gathered and exchanged, which roles must be played in the process by a given set of parties, and the steps that need to be taken to achieve the overall goal. Example roles that might be defined in a process template to describe a "Payment" are "Buyer", "Seller", "Banker". In web service terms, a process template comprises one or more sub-processes, each sub-process describing a web service interaction.

When a process template is interpreted and executed by the process broker, it becomes a running instance of the process it describes, and the roles defined in it must be bound to actual participating parties, whether these are clients of the processes broker, or services the process broker uses, or is told to use by clients.

A process template in the preferred embodiment of the invention is static in the sense that it is stored in a database with other process templates in the system and remain unchanged during execution.

Sensitive details are needed in some processes whereby one desires to restrict the access to sensitive details for some parties involved.

Protocol converter 39 comprises methods for, when receiving messages from a client, converting the message transport protocol to the common protocol if it is different from the common protocol; and for, when sending a message to a client, converting the message transport protocol to the client's transport protocol if the client uses a different transport protocol.

Encryption techniques can deal with the problem of sensitive details encountered in multiple node systems. Domains of trust exist between like nodes and related nodes, for instance in the embodiment they exist between clients; between a client and their payment service; and between payment services. One situation is when each client has the same level of trust and sees all data for each node. Another situation is when communication between the client and its respective payment service is encrypted with keys known only to the client and that node, no other node is aware. Another situation is when two payment systems are aware of each other and will have exchanged public encryption keys independently or through the broker; therefore data sent through the broker so encrypted will be unknown to the broker. In this third case, the broker is only a semi-trusted third party process co-ordinator because it is allowed to pass on the sensitive data but does not know what it is.

In this last case the messages are partially encrypted because only the sensitive data is encrypted and the message is unencrypted. Such a solution has been addressed by the IBM MQe product, where partial encryption of documents and message level encryption is possible so that messages can be routed through nodes without the risk of them being visible to intermediary nodes. However, this product is purely a messaging platform and is the basis for building processes such as the embodiment. IBM MQe operates in a homogeneous environment where MQe is present at each node (in this case the client, payment service and all services to be invoked).

A heterogeneous system has a common network transport protocol. The process broker has a substantially common network transport protocol to co-ordinate a process but also comprises means for converting protocols to and from the common protocol if one node does not support the common protocol. Since the process broker is at the centre of the process it is an ideal position to perform such a function and allows the nodes to remain thin and to communicate using their native transport protocol.

Two example process templates are described in this embodiment. Each of these process templates are stored in the process template repository 32. Process templates define services using standard interface definitions. This database of processes templates can be referenced by type and retrieved for interpretation and execution by the Process Engine 30.

Figure 4:
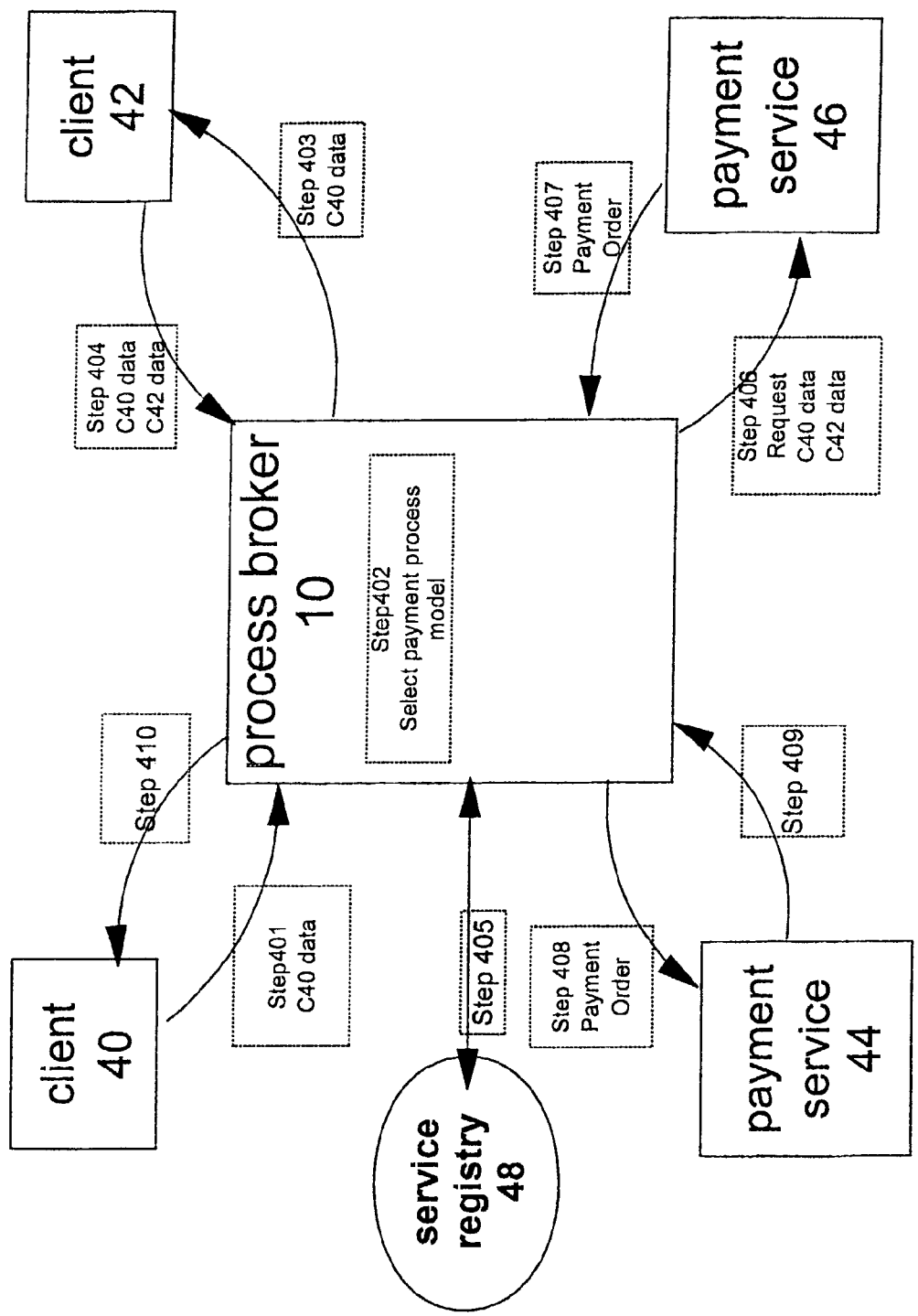
FIG. 4 is a multi-node process flow of a payment process template.

The payment process template of FIG. 4 transfers an electronic payment order directly from a payment service of a client 42 to a payment service of the client 40. For instance a pair of clients are doing business, and a payment of $1 is required to occur between them. Client 40 (the Seller) wants payment from Client 42 (the Buyer).

In Step 401 client 40 sends a request and data to process broker 10. The request data (C40 data) contains the name of Client 40's Payment Service details (Payment Service 44 where a payment can be made to), the amount to be paid ($1), and a reference to Client 40 that the process broker 10 will understand (e.g. client 40's node name or address). No session id is included in the message.

In step 402 process broker 10 receives the message via message listener 34. Message listener 34 identifies that there is no session id and passes it to process interpreter 36. Process interpreter 36 parses and selects the payment process template as directed by the request. The process interpreter 36 retrieves the process template for a payment process from the process template repository 32 and passes the process template to process execution 37. Process execution 37 executes that process template using the request data sent as input to the process. The process execution 37 identifies the initiating role in this process template as the Seller, and binds the client 40 to that role using the role management method. The process execution 37 also binds three other roles in the process: Buyer to Client 42; BuyerBankingService to Payment service 46 and SellerBankingService to payment service 44. The SellerBankingService is specified in the request data (C40) and is bound to PaymentService 44 by the process interpreter 36 in this step 402 whereas the BuyerBankingService is bound after step 404.

Step 403 is the first step of the process template as executed by the process execution 37 and this step requests associated data from client 42. The first process step is defined in terms of a request document for banking service details from the Buyer role. The Buyer role has previously been resolved as client 42 as the input data specifies Client 42.

Client 42 receives the request document and respond by specifying that payment service 46 is the BuyerBankingService based on the seller data (amount=$1). Client 42 adds its own data (C42 data) to the request document based on client 40's data and sends it back to process broker 10.

In step 404 process execution receives a request document from client 42. In this step process execution calls the role management method and payment service 46 is bound to the BuyerBankingService role after receipt of the client 42 data by the process interpreter 36.

In step 405 process execution calls the service registry 48 if there is a need to acquire node addresses for the payment service 44 and 46. This process step requests payment service 44 & 46's connection details from the service registry 48, as these are bound to the roles for SellerBankingService and BuyerBankingService respectively.

In step 406 process execution 37 sends a request document (buyer details, seller details, amount) to client 42's payment service 46 for a payment order to be made out, payable to client 40.

In step 407 process execution 37 receives a payment order from the service registry 48 if all details in order.

In step 408 the next flow step in the process template deposits payment order in client 40's payment service 44.

In step 409 payment service 44 indicates success or failure and step 410 the last flow step in the process template returns status to client 40.

The second example of a process template is for a more complex process flow involving the exchange of digital goods for payment. No figure is shown for this process as it is the same as FIG. 2 plus a digital rights management (DRM) node.

A pair of clients are doing business. Client 40 (the Seller) wants payment from client 42 (the Buyer) for the amount of $5. In exchange for this, client 40 will transfer ownership of a digital asset, a music file encoded in the MP3 format and protected with a Digital Rights Management (DRM) system run by the music publishing company (DRMService A) that created the music file.

Step 1. client 40 sends an "ExchangeGoodsForPayment" request to the Broker specifying its payment service details (PaymentService 44), its DRM service name (DRMService A), a reference to the music file known by the DRM service (MP3-A) and Client 42's session ID.Step Step 2. The process broker 10 retrieves the ExchangeGoodsForPayment Process Template and binds the supplied data to the appropriate Roles—Buyer, Seller, SellerPaymentService and DRMService.

Step 3. The first process step requests banking service details from the Buyer role. The process broker 10 sends a request for this information to client 42.

Step 4. Client 42 receives the request and responds by specifying that payment service 46 is their banking service. Payment service 46 is bound to the BuyerBankingService (the last Role in the Process Template).

Step 5. In the next process step, the process broker 10 requests payment service 44 & 46's connection details from the service registry 48, as these are bound to the roles for BankingServices for Seller and Buyer respectively, and the connection details for DRMService A, as this is bound to the DRMService role.

Step 6. In the next process step, the process broker 10 sends the composite request to payment service 46 (Buyer details, Seller details, amount) for a payment order to be made out, payable to the Seller.

Step 7. The payment service 46 returns a valid payment order to the process broker 10 if all details are in order.

Step 8. In the next step, the process broker 10 sends the payment order to payment service 44 to verify that the payment order is valid and acceptable.

Step 9. In the next step payment service 44 returns to the broker 10 an indication that the payment order is valid.

Step 10. The process broker 10 now sends a request to the DRMService A to change ownership of the virtual asset (MP3-A) from client 40 to client 42.

Step 11. The DRMService A responds to the process broker 10 by confirming that the change of ownership is actioned, but needs committing to complete.

Step 12. The next process template step sends the payment order to payment service 44 as a deposit to be fulfilled.

Step 13. Payment service 44 indicates success or failure.

Step 14. If the result is failure, then the process broker 10 sends a request to the DRMService A to cancel the ownership change, and sends a failure response back to client 40. However, if the result is success, then the process broker 10 returns a successful status to client 40 (Payment successfully made and asset ownership transferred).

The process broker 10 is described in terms of Business Beans but could be implemented in any number of ways suitable for executing process models e.g. a finite state machine, a directed graph interpreter, etc. For instance, Business Process Beans could use an adaptive business service model, whereas a directed graph flow engine such as IBM MQSeries Work Flow (MQWF) would use Flow Definition Modelling Language (FDML).

What is claimed is:

1. A system for controlling a process between two or more nodes comprising;
    a storage device for storing two or more process templates, each defining a process between the two or more nodes;
    a receiver/sender for receiving and sending messages to and from the nodes;
    a selector for selecting a process template and a second node in response to a message received from a first node;
    a processor for performing the process template including sending a message to the selected second node as defined by a process template and receiving a message from the second node in response; and
    a response sender for sending a response to the first node as a result of performing the selected process template.

2. A system as claimed in claim 1 wherein the first node is a client for evoking a process to buy a product or a service.

3. A system as claimed in claim 1 wherein the second node is a client with goods or services to dispose of.

4. A system as claimed in claim 1 wherein each process template comprises one or more steps and at least one step is an interaction with a node.

5. A system as claimed in claim 1 wherein the process template steps are coded in an interpreted language.

6. A system as claimed in claim 1 wherein a subsequent step in the selected process template is received from a node during execution of a preceding step and said subsequent step is added to the selected process template.

7. A system as claimed in claim 1 further comprising a protocol converter for:
    upon receiving a message from a client, converting a message transport protocol of the message from the client to a common protocol upon the message transport protocol being different from the common protocol; and
    upon sending a message to a client, converting a message transport protocol of the message to the client to the client's transport protocol upon the client using a different transport protocol.

8. A method for controlling a process between two or more nodes comprising;
    storing two or more process templates, each defining a process between the two or more nodes;
    receiving and sending messages to and from the nodes;
    selecting a process template and a second node in response to a message received from a first node;
    performing the process template including sending a message to the selected second node as defined by a process template and receiving a message from the second node in response; and
    sending a response to the first node as a result of performing the selected process template.

9. A method as claimed in claim 8 wherein the first node is a client for evoking a process to buy a product or a service.

10. A method as claimed in claim 8 wherein the second node is a client with goods or services to dispose of.

11. A method as claimed in claim 8 wherein each process template comprises one or more steps and at least one step is an interaction with a node.

12. A method as claimed in claim 8 wherein the process template steps are coded in an interpreted language.

13. A method as claimed in claim 8 wherein a subsequent step in the selected process template is received from a node during execution of a preceding step and said subsequent step is added to the selected process template.

14. A method as claimed in claim 8 further comprising the steps of
    upon receiving messages from a client, converting a message transport protocol of the message from the client to a common protocol using a protocol converter upon the message transport protocol being different from the common protocol; and
    upon sending a message to a client, converting a message transport protocol of the message to the client to the client's transport protocol using a protocol converter upon the client using a different transport protocol.

15. A computer program product comprising a computer readable storage medium having computer readable instruction embedded therein, when ran on a computer system, for controlling the computer system to perform the steps of:
    storing two or more process templates, each defining a process between the two or more nodes;
    receiving and sending messages to and from the nodes;
    selecting a process template and a second node in response to a message received from a first node;
    performing the process template including sending a message to the selected second node as defined by a process template and receiving a message from the second node in response; and
    sending a response to the first node as a result of performing the selected process template.

16. A computer program product as claimed in claim 15 wherein the first node is a client for evoking a process to buy a product or a service.

17. A computer program product as claimed in claim 15 wherein the second node is a client with goods or services to dispose of.

18. A computer program product as claimed in claim 15 wherein each process template comprises one or more steps and at least one step is an interaction with a node.

19. A computer program product as claimed in claim 15 wherein the process template steps are coded in an interpreted language.

20. A computer program product as claimed in claim 15 wherein a subsequent step in the selected process template is received from a node during execution of a preceding step and said subsequent step is added to the selected process template.

21. A computer program product as claimed in claim 15 further comprising the steps of
    upon receiving messages from a client, converting a message transport protocol of the message from the client to a common protocol using a protocol converter upon the message transport protocol being different from the common protocol; and
    upon sending a message to a client, converting a message transport protocol of the message to the client to the client's transport protocol using a protocol converter upon the client using a different transport protocol.

* * * * *